Aug. 14, 1923.

E. O. STERNS

SYSTEM OF LUBRICATING GAS ENGINES

Filed July 26, 1921

1,464,733

Inventor
Edward O. Sterns
by Fincel Fincel
his Attorneys

Patented Aug. 14, 1923.

1,464,733

UNITED STATES PATENT OFFICE.

EDWARD O. STERNS, OF COLUMBUS, OHIO, ASSIGNOR TO THE STERNS GAS ENGINE LUBRICATOR COMPANY, OF COLUMBUS, OHIO, A CORPORATION OF OHIO.

SYSTEM OF LUBRICATING GAS ENGINES.

Application filed July 26, 1921. Serial No. 487,753.

*To all whom it may concern:*

Be it known that I, EDWARD O. STERNS, a citizen of the United States, residing at Columbus, in the county of Franklin and State of Ohio, have invented a certain new and useful Improvement in Systems of Lubricating Gas Engines, of which the following is a specification.

My invention relates to oiling systems for internal combustion engines and has for its object the providing of means whereby the combustion chambers and parts adjacent thereto may be properly lubricated in accordance to the actual requirements.

Another object of my invention is to provide means simple in construction, positive in operation and compact in assemblage for carrying out my primary object.

A still further object of the invention is to so construct the elements thereof that the working parts are entirely enclosed and form a part of the circuit through which the lubricant passes.

These and other objects of my invention will appear from the annexed drawings taken in consideration with the following specifications.

With the above objects in view, my invention consists in providing a lubricant circuit emanating from a suitable lubricant supply and terminating in the combustion chamber of an internal combustion engine and providing means intermediate such points and within said circuit for controlling and regulating the supply of lubricant therethrough.

The invention further consists in parts and combination of parts, all of which will be hereinafter more fully set forth and claimed.

Figure 1:
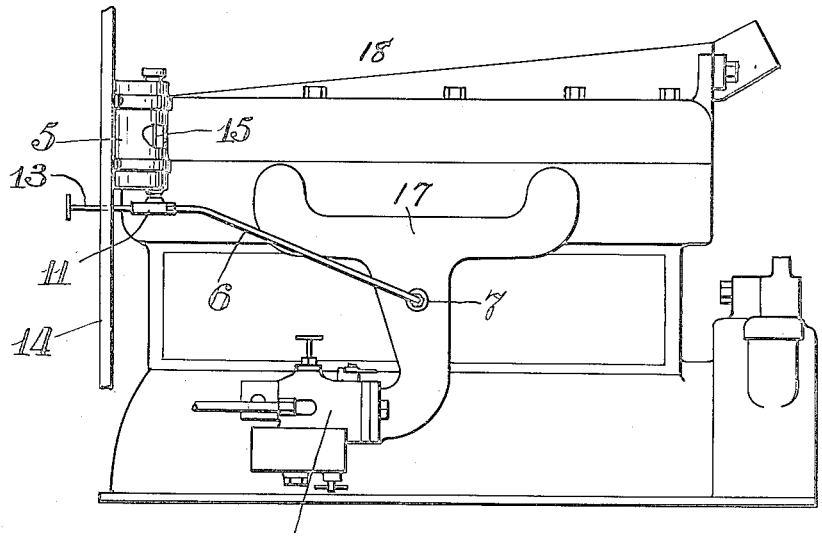

In the drawings Fig. 1 is a side elevation of an engine showing the invention as applied thereto.

Figure 3:
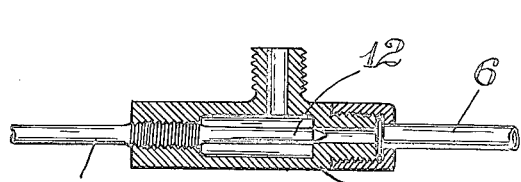
Figure 2:
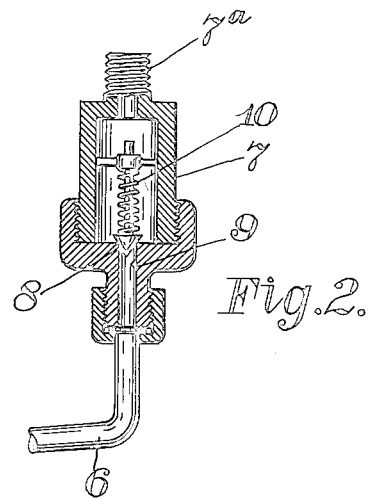

Fig. 2 is a cross sectional view of the controlling valve employed in the invention, and Fig. 3, is a cross sectional view of the regulating valve designed to be manually operable by the operator of the engine.

Heretofore and before my invention, attempts have been made to introduce oil into the combustion chamber of internal combustion engines with more or less success but the objections have been many and frequent due to various causes and effects chief among which were the inability to control the supply of lubricant in accordance with the speed of the engine and where attempts have been made to correct such defects the mechanism was of such complicated natures as to make them successful in theory only, rather than in practice.

To clearly illustrate my invention I have shown a lubricant supply reservoir 5, having direct communication, by means of the conduit 6, and valve casing 7, to the intake manifold 17, of the engine 18. The mechanism within the valve casing 7, acts to control the supply of oil through the conduit in accordance with the demands of the engine; that is as the speed of the engine increases the supply of oil is also increased. To carry out this system I have provided the valve casing 7, within which is located the slidably mounted valve 8, which seats itself at the inner end of the hollow portion 9, and is held normally in a closed position by means of the spring 10.

From the above it will be seen that as the engine creates a vacuum in the intake manifold the valve 8, is drawn against the spring 10, thereby controlling the passage of lubricant through the valve casing 7. The vacuum at the same time carries with it the lubricant that has passed the valve 8, and brings such lubricant directly into the combustion chamber of the engine thereby lubricating the cylinder walls, wrist pins, intake and exhaust valves and any other immediately adjacent working parts.

In order to regulate the supply of lubricant to the valve casing 7, I have provided the valve shown in Fig. 3, consisting of a casing 11, into which is screw threaded the needle valve 12. The handle 13 is adapted to pass through the control board of the auto body to which the lubricant reservoir 5, is attached thereby permitting the regulating of the supply of lubricant from the driver's seat.

From the above it will be seen I have provided a lubricating system complete within itself, depending upon no external connections nor auxiliary attachments.

While I have illustrated my invention as I now deem it best to employ the same, I do not wish to be limited thereto except in so far as the annexed claims shall limit me as modifications in construction of the various parts may be made without departing from the invention.

Having thus described my invention, what I wish to claim is:

Means for lubricating the cylinder walls of an internal combustion engine, comprising an auxiliary lubricant supply source, a conduit leading therefrom to the intake manifold of said engine in combination with a valve located in said conduit adapted to be operated by the suction created in said manifold whereby said lubricant will cease to flow from said source when said engine is idle and be caused to flow upon the intake stroke of the piston of said engine when said engine is in operation.

EDWARD O. STERNS.